United States Patent
Baker, Sr.

(10) Patent No.: US 11,455,838 B2
(45) Date of Patent: Sep. 27, 2022

(54) SYSTEM FOR MONITORING ARRIVAL OF A VEHICLE AT A GIVEN LOCATION AND ASSOCIATED METHODS

(71) Applicant: ParkHub, Inc., Dallas, TX (US)

(72) Inventor: George Frederick Baker, Sr., Dallas, TX (US)

(73) Assignee: PARKHUB, INC., Dallas, TX (US)

(*) Notice: Subject to any disclaimer, the term of this patent is extended or adjusted under 35 U.S.C. 154(b) by 242 days.

(21) Appl. No.: 14/995,157

(22) Filed: Jan. 13, 2016

(65) Prior Publication Data
US 2017/0200322 A1    Jul. 13, 2017

(51) Int. Cl.
| | |
|---|---|
| G07B 15/02 | (2011.01) |
| G06Q 30/00 | (2012.01) |
| G07F 7/08 | (2006.01) |
| G06Q 20/12 | (2012.01) |
| G07F 17/24 | (2006.01) |
| G06Q 20/14 | (2012.01) |

(52) U.S. Cl.
CPC ........... *G07B 15/02* (2013.01); *G06Q 20/127* (2013.01); *G06Q 20/145* (2013.01); *G06Q 30/0185* (2013.01); *G07F 7/0886* (2013.01); *G07F 17/24* (2013.01); *G07F 17/246* (2013.01)

(58) Field of Classification Search
CPC ........ G07B 15/02; G07B 15/00; G07B 15/04; G06Q 20/127; G06Q 20/145; G06Q 20/32; G06Q 30/0185; G07F 7/0886; G07F 17/24; G07F 17/246
See application file for complete search history.

(56) References Cited

U.S. PATENT DOCUMENTS

| | | | |
|---|---|---|---|
| 3,105,221 | A | 9/1963 | Schwarz |
| 3,541,308 | A | 11/1970 | Ruby |
| 4,239,415 | A | 12/1980 | Blikken |
| 4,361,202 | A | 11/1982 | Minovitch |

(Continued)

FOREIGN PATENT DOCUMENTS

| | | |
|---|---|---|
| DE | 10 2005 040 983 A1 | 8/2006 |
| DE | 10 2014 221 751 A1 | 4/2016 |

(Continued)

OTHER PUBLICATIONS

Mutiara et al., "Sensor comparison for smart parking system", Nov. 1, 2015, 2015 1st International Conference on Wireless and Telematics, pp. 1-6 (Year: 2015).*

(Continued)

*Primary Examiner* — Rupangini Singh
(74) *Attorney, Agent, or Firm* — Morris, Manning & Martin, LLP; Daniel E. Sineway, Esq.

(57) ABSTRACT

A system is for monitoring arrival of a vehicle at a given location. The system includes a server, and a vehicle sensing device. The vehicle sensing device is configured to sense arrival of the vehicle to the given location, and to cause information about the vehicle to be transmitted to the server in response to sensing arrival of the vehicle to the given location. The server is configured to determine a context of the vehicle based upon the information about the vehicle, and take action based on the context of the vehicle. The system may be installed at parking lots, shipping yards, restaurants, stores, and other locations.

18 Claims, 10 Drawing Sheets

(56) References Cited

U.S. PATENT DOCUMENTS

| | | | |
|---|---|---|---|
| 5,331,276 A | 7/1994 | Polvani et al. | |
| 5,491,475 A * | 2/1996 | Rouse | G08G 1/042 324/244 |
| 5,621,314 A | 4/1997 | Beck et al. | |
| 5,648,904 A | 7/1997 | Scott | |
| 5,880,682 A | 3/1999 | Soulliard et al. | |
| 6,195,020 B1 | 2/2001 | Brodeur et al. | |
| 6,675,123 B1 | 1/2004 | Edelstein | |
| 6,865,455 B1 | 3/2005 | Wiegert | |
| 8,056,667 B2 | 11/2011 | Moshchuk et al. | |
| 8,099,214 B2 | 1/2012 | Moshchuk et al. | |
| 8,977,652 B2 | 3/2015 | Hoefner et al. | |
| 9,311,816 B2 | 4/2016 | Engler et al. | |
| 9,408,041 B1 | 8/2016 | Abehassera et al. | |
| 9,696,721 B1 | 7/2017 | Myers et al. | |
| 10,135,440 B2 | 11/2018 | Taylor et al. | |
| 10,446,024 B2 | 10/2019 | O'Callaghan | |
| 10,713,947 B2 | 7/2020 | O'Callaghan | |
| 10,721,623 B2 | 7/2020 | Albanese et al. | |
| 10,803,423 B2 | 10/2020 | Baker, Sr. | |
| 2001/0027360 A1 | 10/2001 | Nakano et al. | |
| 2002/0190856 A1 | 12/2002 | Howard | |
| 2004/0012481 A1 * | 1/2004 | Brusseaux | E04H 6/42 340/5.7 |
| 2004/0222903 A1 | 11/2004 | Li | |
| 2005/0046598 A1 | 3/2005 | Allen et al. | |
| 2005/0280555 A1 | 12/2005 | Warner | |
| 2007/0015485 A1 | 1/2007 | Debiasio et al. | |
| 2007/0050240 A1 | 3/2007 | Belani et al. | |
| 2007/0129974 A1 | 6/2007 | Chen et al. | |
| 2007/0162218 A1 | 7/2007 | Cattin et al. | |
| 2007/0245158 A1 | 10/2007 | Giobbi et al. | |
| 2008/0153515 A1 | 6/2008 | Mock et al. | |
| 2010/0026521 A1 | 2/2010 | Noel, II | |
| 2011/0048103 A1 * | 3/2011 | Su | G01C 21/16 73/1.79 |
| 2011/0057815 A1 * | 3/2011 | King | G07B 15/02 340/932.2 |
| 2011/0099126 A1 * | 4/2011 | Belani | G06Q 30/0284 705/418 |
| 2011/0137773 A1 * | 6/2011 | Davis, III | G01G 19/4142 705/34 |
| 2011/0172909 A1 * | 7/2011 | Kahn | G01C 21/165 701/533 |
| 2011/0213672 A1 * | 9/2011 | Redmann | G06Q 20/209 705/24 |
| 2012/0056758 A1 | 3/2012 | Kuhlman et al. | |
| 2012/0092190 A1 * | 4/2012 | Stefik | G06Q 10/02 340/932.2 |
| 2012/0095791 A1 | 4/2012 | Stefik et al. | |
| 2012/0109760 A1 | 5/2012 | Koiso | |
| 2012/0182160 A1 | 7/2012 | Hod | |
| 2012/0246079 A1 | 9/2012 | Wilson et al. | |
| 2012/0285790 A1 | 11/2012 | Jones et al. | |
| 2013/0103200 A1 | 4/2013 | Tucker et al. | |
| 2013/0135118 A1 | 5/2013 | Ricci | |
| 2013/0147954 A1 | 6/2013 | Song et al. | |
| 2014/0036076 A1 * | 2/2014 | Nerayoff | H04N 7/181 348/148 |
| 2014/0046506 A1 | 2/2014 | Reichel et al. | |
| 2014/0218218 A1 | 8/2014 | Lloreda et al. | |
| 2014/0232518 A1 | 8/2014 | Stoehr | |
| 2014/0232563 A1 | 8/2014 | Engler et al. | |
| 2014/0249742 A1 * | 9/2014 | Krivacic | G06Q 10/02 701/400 |
| 2014/0350853 A1 | 11/2014 | Proux | |
| 2014/0368327 A1 | 12/2014 | Darrer et al. | |
| 2015/0016661 A1 * | 1/2015 | Lord | H04N 21/42203 382/100 |
| 2015/0066607 A1 | 3/2015 | Fiorucci et al. | |
| 2015/0117704 A1 | 4/2015 | Bulan et al. | |
| 2015/0138001 A1 | 5/2015 | Davies et al. | |
| 2015/0149265 A1 | 5/2015 | Huntzicker et al. | |
| 2015/0179070 A1 | 6/2015 | Sandbrook | |
| 2015/0241241 A1 | 8/2015 | Cudak et al. | |
| 2015/0279210 A1 | 10/2015 | Zafiroglu et al. | |
| 2015/0294210 A1 | 10/2015 | Martinez de Velasco Cortina et al. | |
| 2015/0317840 A1 | 11/2015 | Dutta et al. | |
| 2015/0334678 A1 * | 11/2015 | MacGougan | G01S 19/22 701/451 |
| 2015/0346727 A1 | 12/2015 | Ramanujam | |
| 2015/0367234 A1 | 12/2015 | Jones et al. | |
| 2015/0369618 A1 | 12/2015 | Barnard et al. | |
| 2016/0071415 A1 * | 3/2016 | Maeda | G06K 9/00812 348/148 |
| 2016/0104328 A1 * | 4/2016 | Chen | G07C 5/0858 701/31.5 |
| 2016/0125736 A1 | 5/2016 | Shaik | |
| 2016/0148514 A1 | 5/2016 | Iwami et al. | |
| 2016/0189435 A1 | 6/2016 | Beaurepaire | |
| 2016/0203649 A1 | 7/2016 | Berkobin et al. | |
| 2016/0219012 A1 | 7/2016 | Liao et al. | |
| 2016/0275794 A1 | 9/2016 | Chang | |
| 2016/0286627 A1 * | 9/2016 | Chen | H05B 37/0245 |
| 2016/0328961 A1 | 11/2016 | Garces Cadenas et al. | |
| 2017/0008515 A1 | 1/2017 | Seo et al. | |
| 2017/0109942 A1 | 4/2017 | Zivkovic et al. | |
| 2017/0132922 A1 * | 5/2017 | Gupta | G08G 1/0962 |
| 2017/0148230 A1 | 5/2017 | Richard | |
| 2017/1460645 | 5/2017 | Balid et al. | |
| 2017/0200365 A1 | 7/2017 | Baker, Sr. | |
| 2018/0061145 A1 | 3/2018 | Blustein | |
| 2018/0089631 A1 | 3/2018 | Baker, Sr. | |
| 2018/0114438 A1 | 4/2018 | Rajagopalan et al. | |
| 2018/0122152 A1 | 5/2018 | Shin | |
| 2018/0247534 A1 | 8/2018 | Williams | |
| 2019/0088119 A1 | 3/2019 | O'Callaghan | |
| 2019/0088129 A1 | 3/2019 | O'Callaghan | |

FOREIGN PATENT DOCUMENTS

| | | |
|---|---|---|
| DE | 10 2014 221 777 A1 | 4/2016 |
| DE | 10 2015 202 471 A1 | 8/2016 |
| WO | WO-2007/134606 A1 | 11/2007 |
| WO | WO-2015/144396 | 10/2015 |
| WO | WO-2016/130719 A2 | 8/2016 |

OTHER PUBLICATIONS

International Search Report and Written Opinion for corresponding International Patent Application No. PCT/US2017012292 dated Jul. 7, 2017, 22 pages.

Ferreira et al., Self-automated parking lots for autonomous vehicles based on vehicular ad hoc networking. IEEE Intelligent Vehicles Symposium, 472-479, 2014. [retrieved on Jun. 11, 2017.] Retrieved from the Internet, 9 pages<URL:https://pdfs.semanticsscholar.org/f23e/25d41e9dfee3ce8a0e2be372c64aa1e2c91f.pdf>.

Final Office Action on U.S. Appl. No. 15/711,796 dated Oct. 22, 2018.

International Search Report and Written Opinion for corresponding International Patent Application No. PCT/US2017/053672 dated Dec. 1, 2017, 15 pages.

International Search Report and Written Opinion dated Oct. 29, 2018 in PCT/US2018/051568; 14 pages.

International Search Report and Written Opinion dated Feb. 13, 2018 for International Patent Application No. PCT/US2017/062180, 8 pages.

Non-Final Office Action on U.S. Appl. No. 15/360,670, dated Sep. 20, 2018, 11 pgs.

Non-Final Office Action on U.S. Appl. No. 15/280,790 dated Oct. 29, 2018.

Non-Final Office Action on U.S. Appl. No. 15/711,796 dated May 17, 2018.

Non-Final Office Action on U.S. Appl. No. 15/711,897 dated Jan. 18, 2019.

Notice of Allowance on U.S. Appl. No. 15/360,670 dated Jan. 8, 2019.

(56) References Cited

OTHER PUBLICATIONS

Notice of Allowance on U.S. Appl. No. 15/711,796 dated Dec. 28, 2018.
International Search Report and Written Opinion for PCT/US2018/52005 dated Jan. 29, 2019, 7 pages.
Notice of Allowance on U.S. Appl. No. 15/711,796 dated Feb. 4, 2019.
Non-Final Office Action on U.S. Appl. No. 16/442,031 dated Jul. 17, 2019.
Notice of Allowance on U.S. Appl. No. 15/711,897 dated Aug. 14, 2019.
Final Office Action on U.S. Appl. No. 14/995,148 dated Mar. 12, 2019.
Non-Final Office Action on U.S. Appl. No. 14/995,148 dated Oct. 4, 2019.
International Preliminary Report on Patentability for PCT/US2017/053672 dated Apr. 11, 2019, 13 pages.
Final Office Action on U.S. Appl. No. 15/280,790 dated Apr. 2, 2019.
European Search Report for EP Patent Application No. 17857317.6 dated Feb. 4, 2020.
Final Office Action on U.S. Appl. No. 14/995,148 dated Feb. 14, 2020.
Final Office Action on U.S. Appl. No. 16/442,031 dated Dec. 26, 2019.
Non-Final Office Action on U.S. Appl. No. 16/416,662 dated Nov. 7, 2019.
Non-Final Office Action on U.S. Appl. No. 16/601,277 dated Jun. 1, 2020.
Final Office Action on U.S. Appl. No. 16/416,662 dated Mar. 13, 2020.
Non-Final Office Action on U.S. Appl. No. 15/280,790 dated Mar. 24, 2020.
Final Office Action on U.S. Appl. No. 14/995,148 dated Mar. 3, 2021.

* cited by examiner

SYSTEM FOR MONITORING ARRIVAL OF A VEHICLE AT A GIVEN LOCATION AND ASSOCIATED METHODS

RELATED APPLICATIONS

This application for patent is related to co-pending application U.S. Ser. No. 14/995,148, filed on Jan. 13, 2016, entitled "System for Monitoring Arrival of a Vehicle at a Given Location and Associated Methods", the entire disclosure of which is incorporated herein by reference.

TECHNICAL FIELD

This disclosure related to the field of parking lot monitoring, and, more particularly, to systems and methods for monitoring vehicle arrival and taking action in response thereto.

BACKGROUND

In many cities, motor vehicles such as cars are the predominant mode of transportion utilized by residents. In some cases, parking lots for motor vehicles are not monitored or attended, and motor vehicles come and go at the direction of their operators. However, in other cases, parking lots are to be monitored and attended. For example, a human attendant physically located at the parking lot may track the inventor of remaining spaces in the parking lot, may direct motor vehicles toward given spaces, and, in the case where the parking lot is a pay lot, may collect money from occupants of the motor vehicles in exchange for provision of a parking space.

Complete management of a parking lot by a human may be undesirable for a variety of reasons. For example, a computing device may be able to more efficiently manage inventory or accept payment, thereby enabling more efficient management of the parking lot, or for quicker payment processing times.

To that end, automated parking lot management systems have been developed. For example, a device may be installed at the entrance of a parking lot that accepts payment from a driver of a motor vehicle, and such device may monitor the number of vehicles in the lot via a counter. While this may provide for a variety of advantages over complete management of the parking lot by a human, the usage of such devices may be confusing to users, or users may incorrectly input information into the device, resulting in incorrect management.

Therefore, further developments in systems for parking lot management are needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Described herein is a system is for monitoring arrival of a vehicle at a given location. The system includes a server, and a vehicle sensing device. The vehicle sensing device is configured to sense arrival of the vehicle to the given location, and to transmit information about the vehicle to the server in response to sensing arrival of the vehicle to the given location. The server is configured to determine a context of the vehicle based upon the information about the vehicle, and take action based on the context of the vehicle.

Also described herein is a vehicle sensing system including at least one vehicle sensing device. The at least one vehicle sensing device includes at least one wireless transceiver, at least one vehicle detector, a processor cooperating with the at least one wireless transceiver and at least one vehicle detector. The processor is configured to detect entry of a vehicle into a given area via the at least one vehicle detector, determine information about the vehicle in response to sensing arrival of the vehicle to the given location using at least one of the at least one wireless transceiver and the at least one vehicle detector, and transmit the information about the vehicle to a server using the at least one wireless transceiver.

BRIEF DESCRIPTION OF THE DRAWINGS

So that the manner in which the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

Figure 1A:
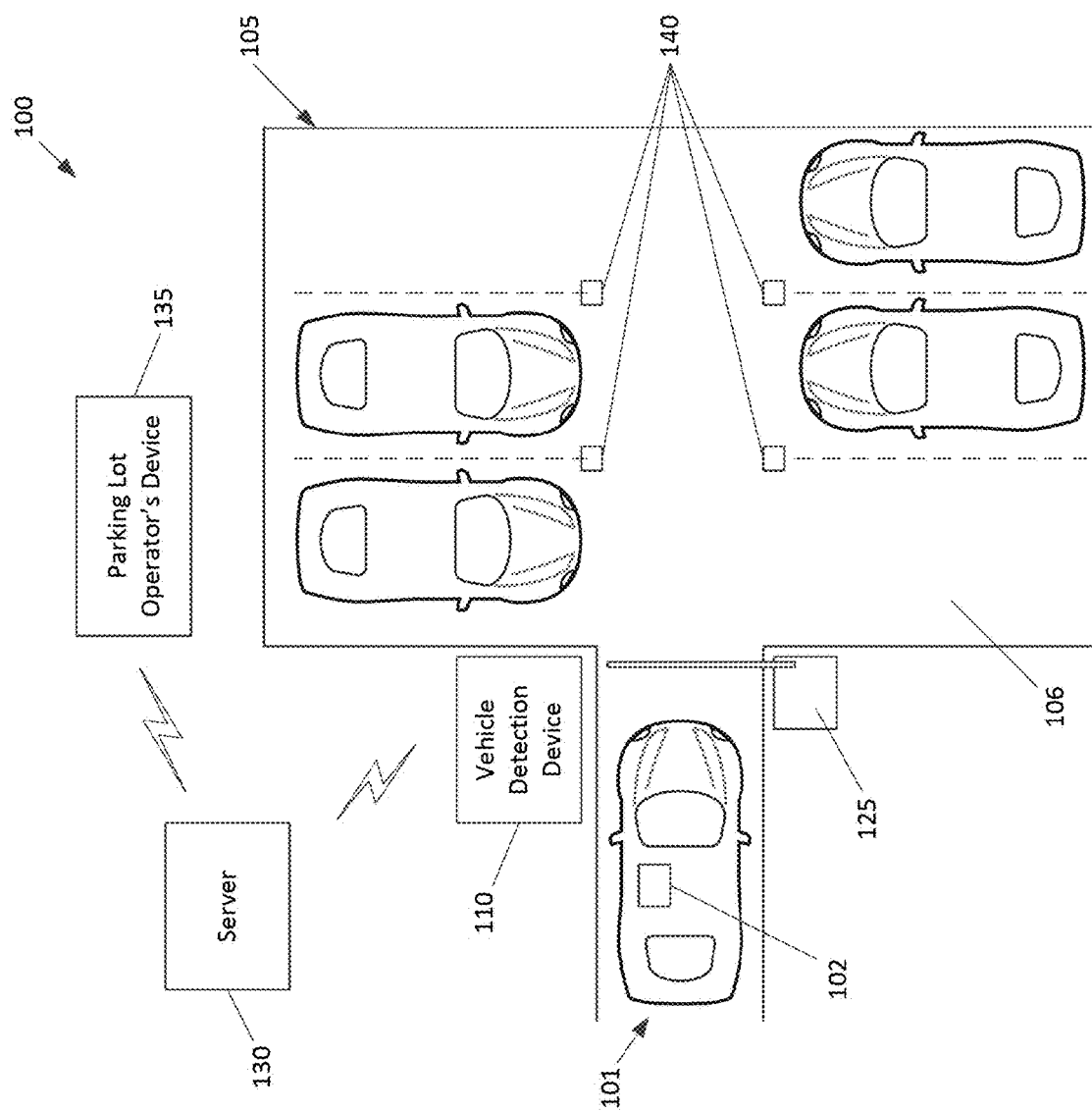
FIG. 1A is a block diagram of a system for monitoring arrival of vehicles, as installed at a parking lot, in accordance with the present disclosure.

With reference to FIG. 1A, a system 100 for monitoring arrival of vehicles is now described. The system 100 is installed at a parking lot 105, at which motor vehicles, such as cars, trucks, and motorcycles may be parked. A vehicle detection device 100 detects arrival of vehicles and/or entry of vehicles and/or departure of vehicles to or from the parking lot 105. As show, a vehicle 101 is adjacent a motor operated gate 125 selectively that permits vehicles to enter and depart from the parking lot 105. A server 130 is in communication with the vehicle detection device 110 over a network, such as the Internet, and receives data from the vehicle detection device 110. The server 130 processes this data 130, and may then send output to, or prompt for input from, a device of an operator of the parking lot 135, or a device 102 within the vehicle 101. Optional sensors or indicators 140 are installed adjacent parking spots 106.

The device 102 within the vehicle 101 may be a mobile wireless communications device utilized by the driver or passenger of the vehicle 101, such as a smartphone, smartwatch, or tablet, or may be a device integrated within the vehicle 101, such as an infotainment system.

Figure 4A:
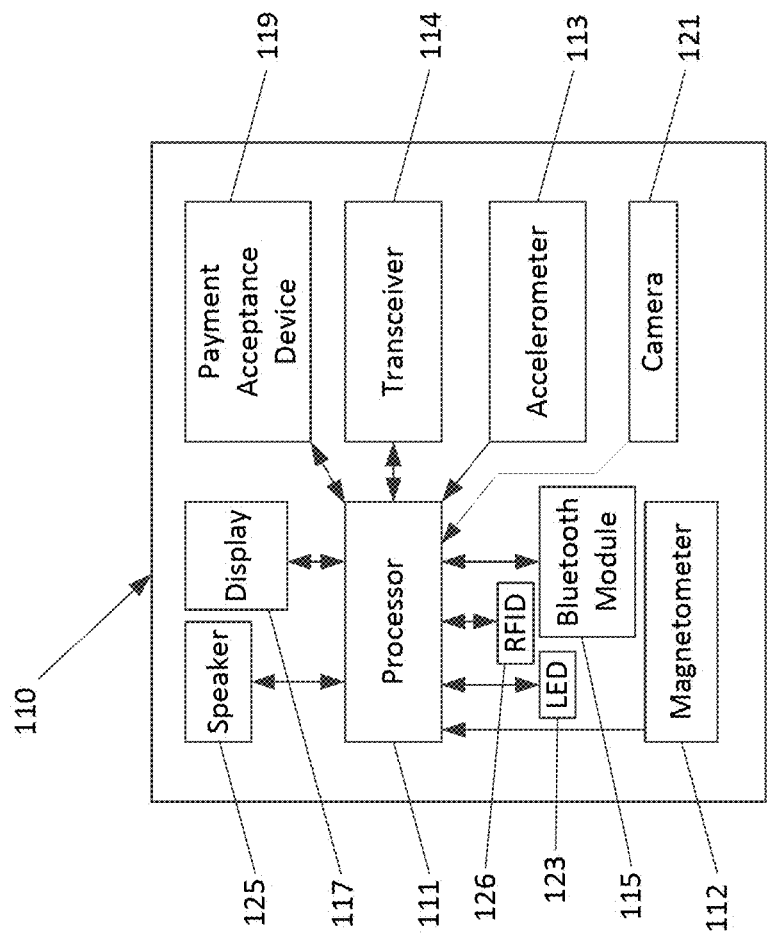
FIG. 4A is a block diagram of a vehicle detection device such as may be used with the systems shown in FIGS. 1-3.

With additional reference to FIG. 4A, further details of the vehicle detection device 110 will now be given. The vehicle detection device 110 includes a processor 111, such as a microprocessor or system on a chip. Coupled to the processor 111 is a magnetometer 112, as well as an accelerometer 113. A Bluetooth module 115 is coupled to the processor 111 for potential communication with the device 102 within the vehicle 101, and a transceiver 114 is coupled to the processor 111 for communication with the server 130 over the wide area network, and/or also with other vehicle detection devices 110 if present, and/or also with the optional sensors 140. A display 117, LED 123, and speaker 125 are coupled to the processor 111 for providing visual or audio output to a user. The display 117, LED 123, and speaker 125 may be utilized for any provided output described below instead of the device 102. A camera 121 is coupled to the processor 111 for taking pictures, such as of the license plate of the vehicle 101, which may be sent to and processed by the server. A payment acceptance device 119 is coupled to the processor 111 for accepting payment from a user. The payment acceptance device 119 may utilize magnetic strip, chip and pin, NFC, or other electronic payment acceptance technologies. In addition, the payment acceptance device 119 may also directly accept hard currency, such as bills and coins. A RFID reader 126 is coupled to the processor 111 for reading RFID tags associated with the vehicle, such as a toll tag mounted in the vehicle, or RFID tags within the tires of the vehicle.

A payment acceptance device 119 is coupled to the processor 111 for accepting payment from a user. The payment acceptance device 119 may utilize magnetic strip, chip and pin, NFC, or other electronic payment acceptance technologies. In addition, the payment acceptance device 119 may also directly accept hard currency, such as bills and coins. It should be appreciated that in some applications, the payment acceptance device 119 may be part of, or may be, the RFID reader 126.

The magnetometer 112 serves to sense metal in vehicles 101 via a change in the local magnetic field, and can thus detect the presence of vehicles 101. The processor 111 may be able to interpret reading from the magnetometer 112 to estimate the dimensions of the vehicle 101, from which a type or configuration of the vehicle may be inferred (i.e. a vehicle estimated to be a car, whereas a larger vehicle is likely to be a truck).

The accelerometer 113 serves to detect vibrations in multiple axes, such as those caused by a passing vehicle 101, and can therefore be used to determine whether the vehicle 101 is entering or leaving the given area. By logging the magnitude and direction of vibrations detected by the accelerometer 113, the processor 111 can infer both the speed of the vehicle, as well as whether the vehicle is arriving or departing.

Due to the use of the accelerometer 113 and magnetometer 112 for detecting vehicles 101, the vehicle detection device 110 is positioned at the entrance and exit to the parking lot 105, and needs not be driven over by the vehicle 101 in order for detection to occur.

As stated, the RFID reader 126 may read RFID tags associated with the vehicle. Thus, the RFID reader 126 may read a code from the RFID tag, and the code may be a toll tag ID number, or may be a tire identification code. Where the code is a toll tag ID, the information about the vehicle may be the toll tag ID, which may in turn be used for identification of the user by looking up the user's information in a table of toll tag ID's, or in processing payment via the toll tag ID. Where the code is a tire identification code, the information about the vehicle may be the tire identification code, which may in turn be used by the server to determine a make and model of the tires on the vehicle, which may in turn be used to determine the type of vehicle and vehicle configuration, as well as the make and model of the vehicle. Also, the information about the vehicle may include the various measurements taken by the accelerometer 113 and magnetometer 112 as well as the make and model of the tires, which may be used to more accurately determine the type of vehicle and vehicle configuration, as well as the make and model of the vehicle.

As stated above, using the transceiver 114, the vehicle detection device 110 may communicate with other vehicle detection devices 110. In addition, one vehicle detection device 110 may act as a relay for another vehicle detection device 110, transmitting information received therefrom to the server 130, or to the device 102 within the vehicle 101. The transceiver 114 may also be used by the vehicle detection device 110 for communication with a fixed or mobile device used by a parking lot attendant, such as a smartphone, tablet, or pay station.

The processor 111 may also cooperate with additional vehicle detection hardware, such as a pressure sensor for vehicle sensing, allowing retrofitting of the vehicle detection device 110 to existing parking lot management installations. In addition, the processor 111 may also cooperate with hardware, such as RFID readers, that read toll tags or toll passes, and/or Bluetooth connections from which vehicle information may be read, and via which payment for parking may be effectuated.

Figure 1B:
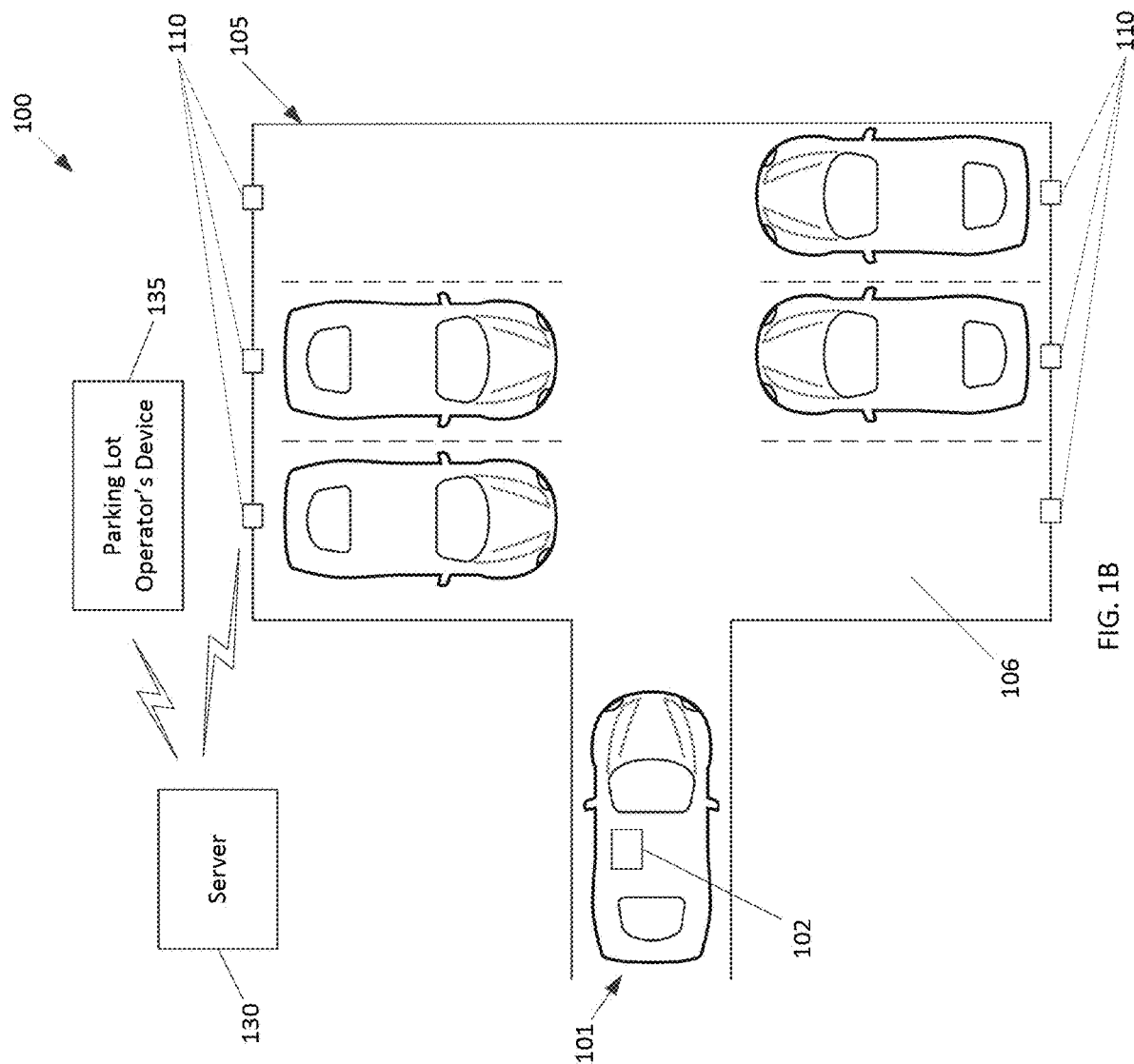
FIG. 1B is a block diagram of a different embodiment of a system for monitoring arrival of vehicles, as installed at a parking lot, in accordance with the present disclosure.

In some applications, such as that shown in FIG. 1B, rather than the vehicle detection device 110 being at the entrance to the parking lot 105, there is a separate vehicle detection device 110 located in each parking space 106. Each of these vehicle detection devices 110 may have the components as described above and below, and may operate as described above and below. In addition, it should be understood that the various vehicle detection devices 110 may communicate with one another via their transceivers 114, their Bluetooth modules 115, or a combination thereof. This communication may be to relay data to and from the server 130, for example. In addition, the various vehicle detection devices 110 may cooperate using their Bluetooth modules 115 to perform triangulation to determine the position of the vehicle 101 within the parking lot 105, and may then direct the driver of the vehicle 101 to the parking space 106 via the device 102 within the vehicle 101, or via their respective displays 117, LEDs 123, and/or speakers 125.

Figure 1C:
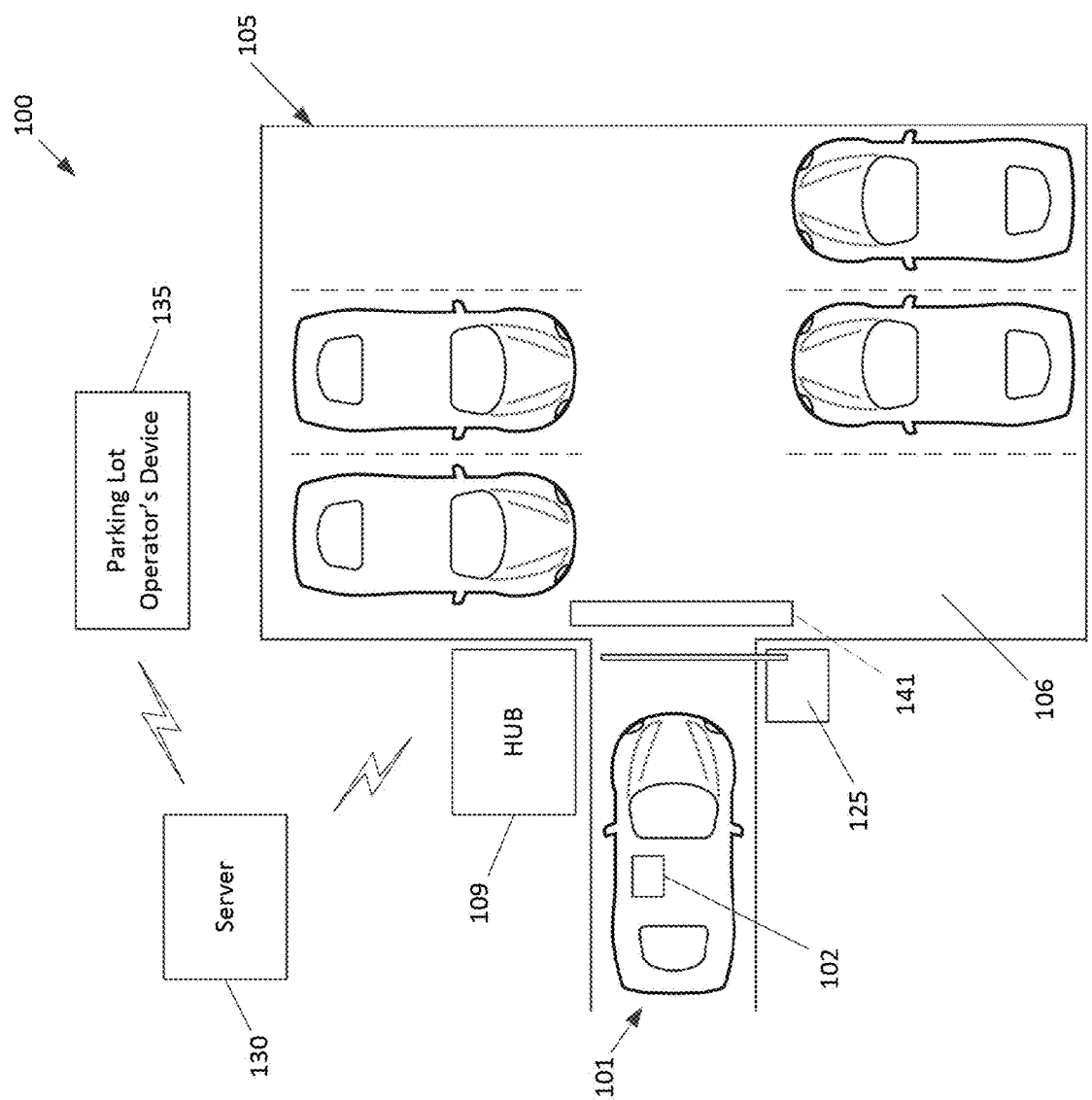
FIG. 1C is a block diagram of a further embodiment of a system for monitoring arrival of vehicles, as installed at a parking lot, in accordance with the present disclosure.
Figure 1D:
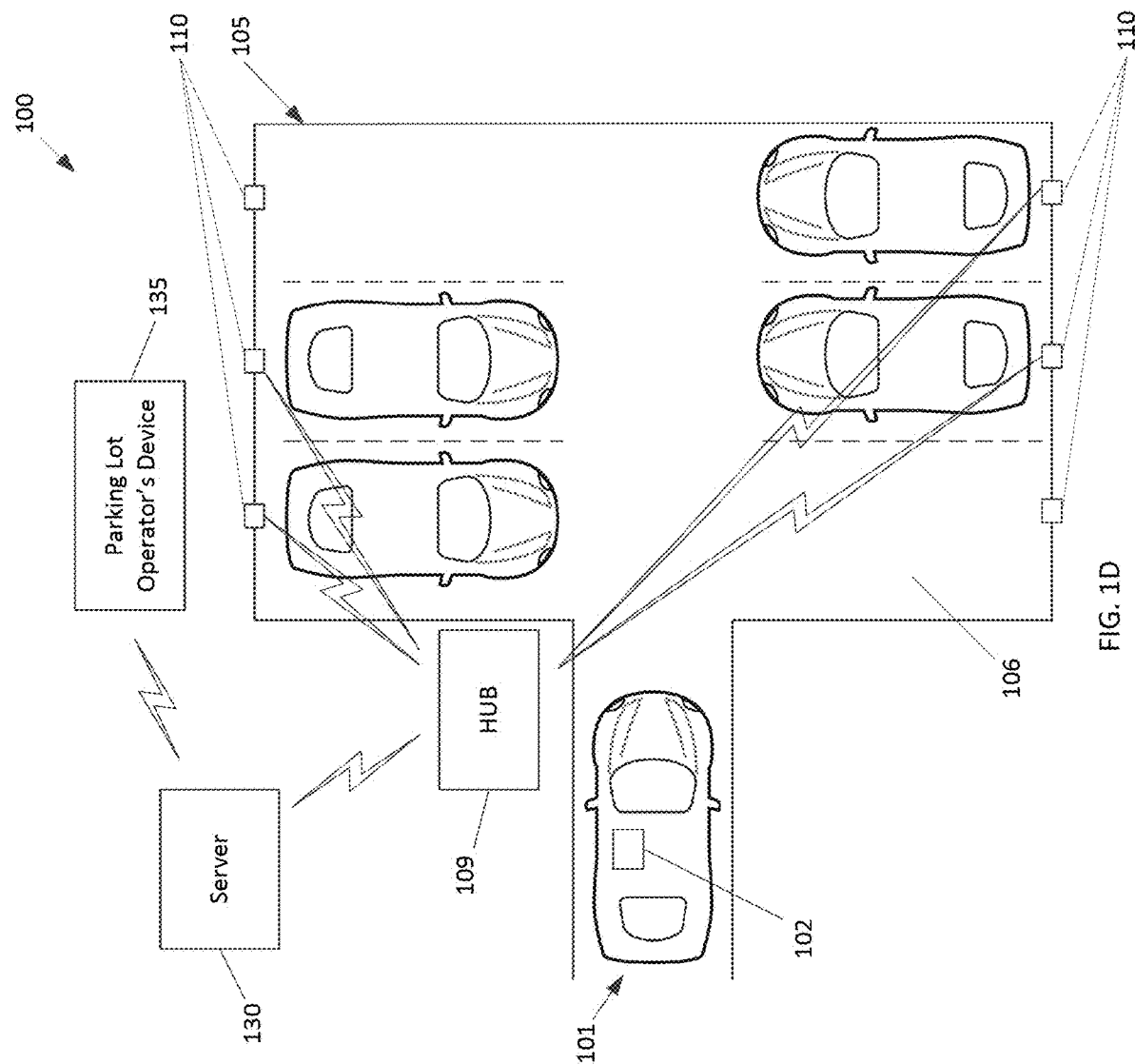
FIG. 1D is a block diagram of an additional embodiment of a system for monitoring arrival of vehicles, as installed at a parking lot, in accordance with the present disclosure.

In other applications, such as that shown in FIG. 1D, rather than directly communicating with the server 130, each vehicle detection device 110 communicates with a hub 109 either wirelessly or over a wire, and the hub 109 in turn communicates with the server 130, serving to pass data to the server 130 from the vehicle detection devices 110, and serving to pass data to the vehicle detection devices 110 from the server 130. It should also be appreciated that the hub 109 may perform any of the functions described above or below as being performed by the vehicle detection device 110.

Figure 5:
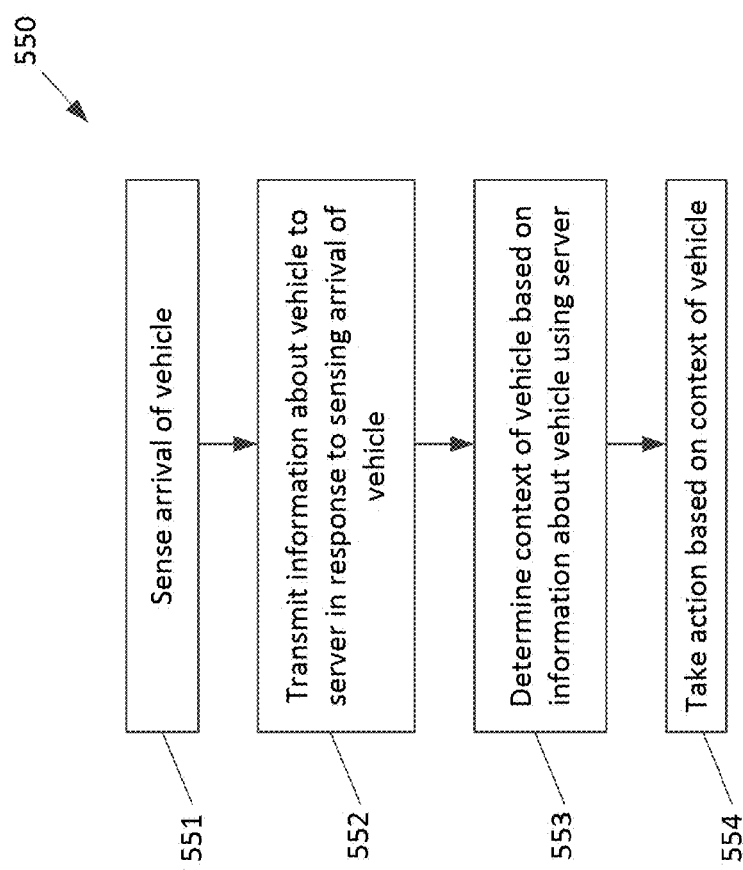
FIG. 5 is a flowchart of a method of monitoring arrival of vehicles, in accordance with the present disclosure.

With additional reference to the flowchart 550 of FIG. 5, a method of monitoring vehicle 101 arrival to a given location, such as a parking lot 105, is now described. The vehicle detection device 110, as described above, operates to sense arrival (or departure) of a vehicle 101 (Block 551). The vehicle detection device 110 then sense information about the vehicle 101, and sends it to the server 130 in response to the sensing of arrival or departure (Block 552). The information about the vehicle may be sensed via the magnetometer 112 and accelerometer 113, and/or may be sensed via interaction with the device 102 within the vehicle 101 via the Bluetooth module 115, or via the transceiver 114.

Next, the server 130 determines a context of the vehicle 101 based on the information received from the vehicle detection device 110 (Block 553). Thereafter, the server 130 takes at least one action based on the context of the vehicle 101 (Block 554).

Through sensing different types of information about the vehicle 101, through determining different contexts, and through taking different actions, the system 100 may be used in a wide variety of applications. For example, the application shown in FIG. 1A is that where the system 100 is installed at a parking lot 105.

A first parking related application is where a driver of the vehicle 101 has prepaid for parking via the device 102. When the vehicle 101 arrives to the parking lot 105, the vehicle detection device 110 operates to read the prepayment (or voucher) information from the device 102, or serves to identify the vehicle 101 via the device 102 and then query the server 130 for the prepayment or voucher information. If the prepayment or voucher is valid (i.e. has been properly paid for the correct amount, and/or if it is an authorized time of day, date, or day of the week), the vehicle detection device 110 or server 130 instructs the gate 125 to open, and updated parking lot inventory information is sent to the parking lot operator's device 135.

If no prepayment is present, or if the prepayment or voucher is not valid for the present time, the vehicle detection device 110 may, either on its own via its display 117, LED 123, and speaker 125, or via the device 102 in the vehicle 101, demand payment for the right to park the vehicle 101 in the parking lot 105. If, within a given amount of time, the payment is not received (from either the device 102, or in pieces from multiple devices 102, or via the payment acceptance device 119) and the vehicle 101 has not left the parking lot, the vehicle detection device 110, either on its own or via the server 130, may notify the parking lot operator's device 135 that the vehicle 101 is parked in the parking lot 105 without having paid for the right to do so.

In a second parking related application, the vehicle detection device 110 serves to detect the number of devices 102 in the vehicle 101, and transmits that information to the server. Since the majority of adults carry a smartphone in today's world, from this number of devices 102 in the vehicle 101, the server 130 can estimate the number of people in the vehicle 101, and may transmit this data to the parking lot operator's device 135, may save this data for future analytics, or may transmit this data to other devices, such as those within a venue adjacent the parking lot 105.

In a third parking related application, the vehicle detection device 110 serves to read user identity information from the device 102 in the vehicle, or to request user identity information associated with the device 102 from the server 130. Then, the server 130 can notify the parking lot operator or venue that the user matching the user identity information has arrived. Therefore, the parking lot operator or venue can prepare for the arrival of that specific user.

As an example, the specific user may have reserved a given parking space 106, and the parking lot operator may manually (via a human attendant) direct the vehicle 101 to park in the parking space 106, or the server 130 may direct the vehicle 101 to park in the parking space 106 via displays incorporated with the sensors 140, or via the display 117, LED 123, and/or speaker 125. In addition, in some applications, the sensors 140 may report to the parking lot operator, the vehicle detection device 110, or the server 130 which spaces are occupied. This functionality may also be performed by the vehicle detection device 110. If the vehicle detection device 110, via the sensors 140 or on its own, determines that the reserved space 106 has been improperly occupied (i.e. the space 106 is occupied, but the vehicle detection device 110 has not detected the device 102 of the specific user), the vehicle detection device 110 may directly or via the server 130 notify the parking lot operator's device 135 that the parking space 106 is occupied by an unauthorized vehicle.

In any such parking applications wherein payment is collected for the parking space 106, the vehicle detection device 110 may determine both an arrival time and a departure time of the vehicle 101, and the payment amount may be based upon the length of time between the arrival time and departure time. The payment amount may be additional or alternatively be based upon the time of day, date, or day of week of the arrival time and/or departure time—for example the payment may be greater on a Saturday than on a Tuesday, or may be less at 2:00 AM than at 9:00 AM. In addition, the payment amount may be dependent upon the weight, type, or configuration of the vehicle 101 (e.g. vehicle size, vehicle weight, vehicle body style, etc), as determined based on readings from the magnetometer 112 and/or accelerometer 113.

In some cases, the vehicle 101 may be authorized to park in the parking lot 105 at the time of parking, but may at a later point in time, before departure, become no longer authorized. For example, the parking lot 105 may be operated by a municipality, and may need to be emptied for street cleaning, trash pickup, etc. In such cases, the server 130 may notify the parking lot operator's device 135 (and thus the municipality's device) that certain vehicles have not yet departed. The municipality can then take appropriate action. In some cases, such notification may additional or alternatively be sent to the device 102.

Another parking application may be where the parking lot 105 is a valet parking lot. The vehicle detection device 110 may this record a unique identifier for the vehicle when it entered the parking lot 105, and thus unique identifier may be transmitted, via the server 130 or directly, to the device 102. A user may request retrieval of the vehicle 101 via provided input to the device 102.

Figure 2:
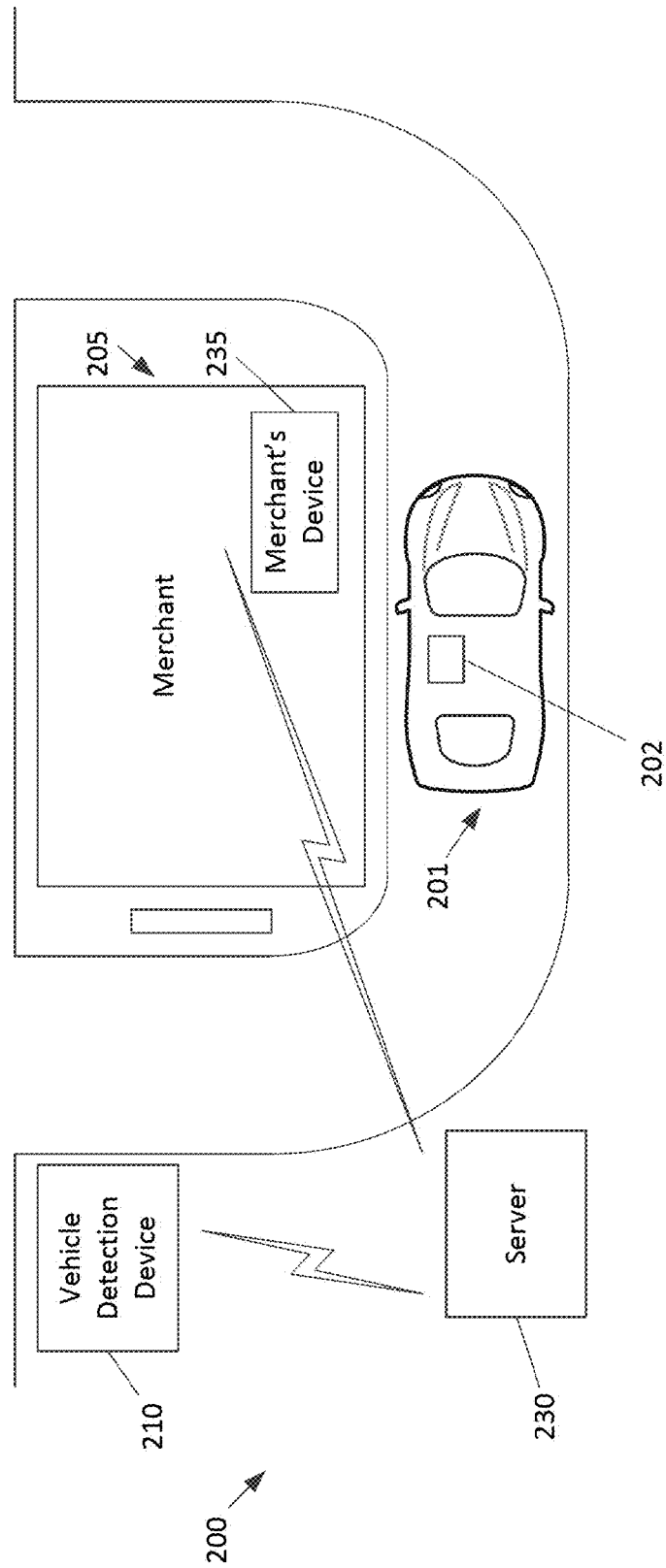
FIG. 2 is a block diagram of a system for monitoring arrival of vehicles, as installed at a merchant, in accordance with the present disclosure.

Another application for the system 200 in which the system 200 is employed at a merchant is now described with additional reference to FIG. 2. Here, the parking lot 205 is a parking lot for a merchant, such as a restaurant, and 205 may be a drive through lane instead of a parking lot. The vehicle detection device 210 can detect when the vehicle 201 arrives at the merchant, and can read the identify of a user from the device 202, or request an identity of the user from the server 230 based on information received from the device 202. The server 230 may then send the identity of the user to the merchant's device 235, which may retrieve order information for the user. In some applications, the server 230 may have the order information for the user, and may pass the order information along to the merchant's device 235. In yet another application, the vehicle detection device 210 may cause the device 202 to prompt the user to enter an order. The user's order may then be transmitted to a device inside the Merchant's business wherein it is prepared and delivered to the user. In the case of 205 being a drive through lane, the system 200 may compute the time required to prepare the user's order and, comparing such time to the time required to prepare other users' orders within the drive through lane, may direct the Merchant's employees to prepare orders in a sequence different from the sequence of vehicles in the drive through queue in an effort to minimize user wait times and maximize efficiency.

Figure 3:
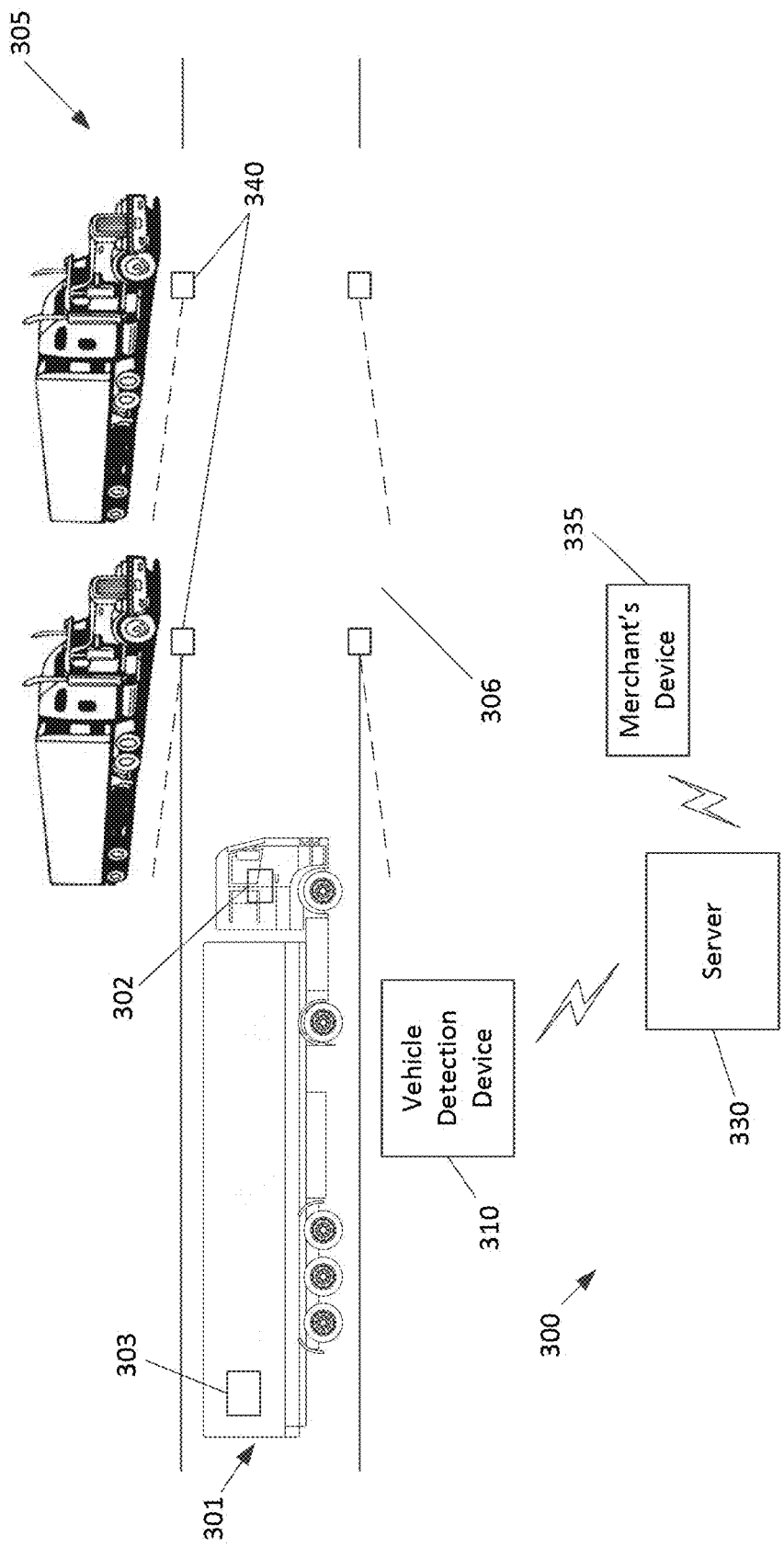
FIG. 3 is a block diagram of a system for monitoring arrival of vehicles, as installed at a shipping log, in accordance with the present disclosure.

Yet another application for the system 300 in which the system 300 is employed at a shipping yard is now described with additional reference to FIG. 3. Here, the parking lot 305 is for trucks 301 at a shipping yard. The vehicle detection system 310 may retrieve a shipping manifest from the device 302, server 330, or shipping yard's device 335, and pass the shipping manifest along to any such device. The server 330 or shipping yard's device 335, knowing that the shipment having that shipping manifest has arrived, may notify the owner of the cargo. The server 330 may, either directly or via the vehicle detection system 310, notify the device 302 or the sensors 306 to direct the driver where to park the truck.

Additional sensors 303 may be placed in the cargo containers carried by the trucks 301, and these sensors may detect when the cargo container is being moved (for example, from a 301 to storage), and transmit that data to the server 330 via the vehicle detection device 310. The server 330 may then report that data to the shipping yard's device 335.

Figure 4B:
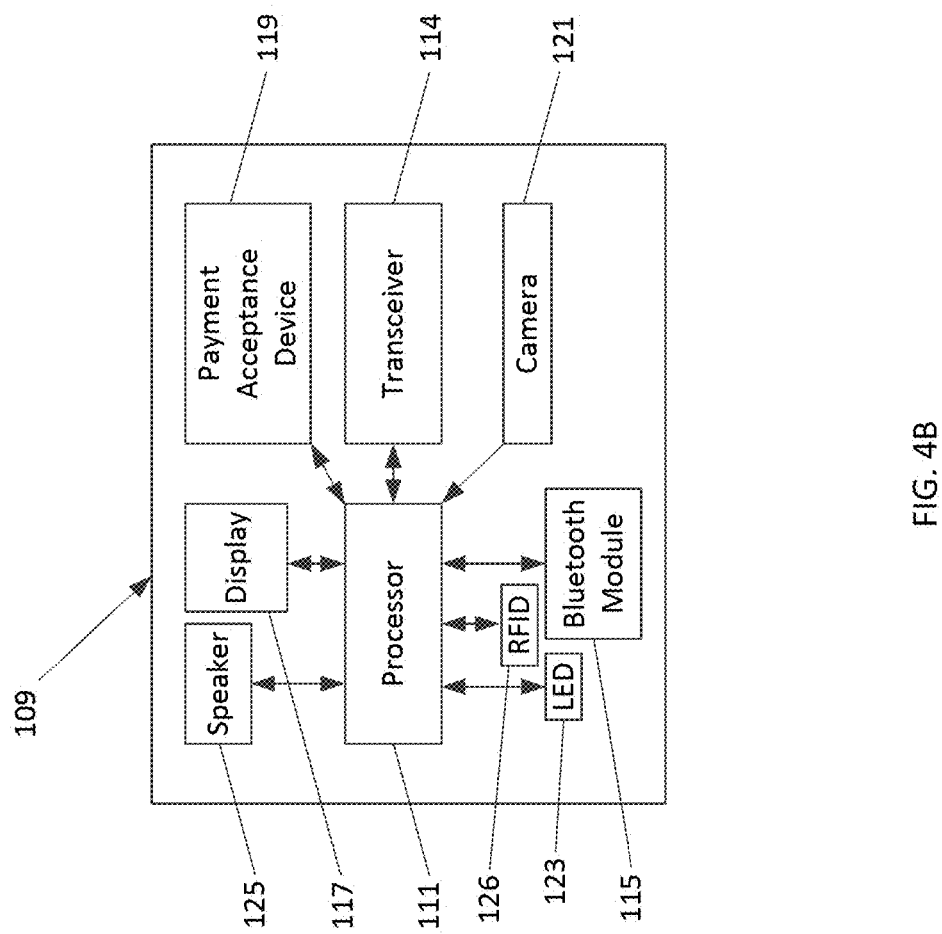
FIG. 4B is a block diagram of a hub device such as may be used with the systems shown in FIGS. 1-3.
Figure 6:
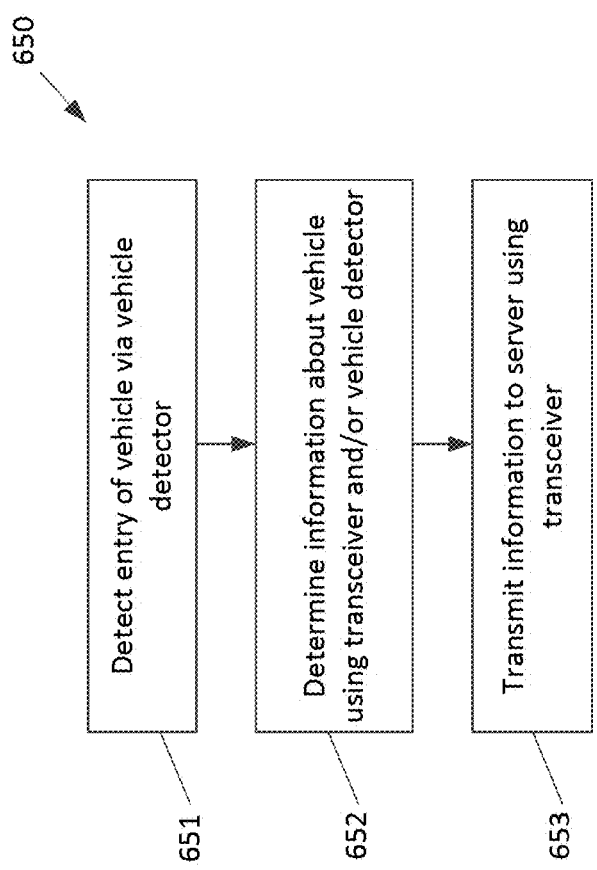
FIG. 6 is a flowchart of a method of operating the vehicle sensing device of FIG. 4A.

Further details of the vehicle sensing system 100 and vehicle sensing device 110 will now be given with reference to FIGS. 4 and 6. A method of operating the vehicle sensing device 110, described with reference to flowchart 650, includes detecting entry of the vehicle to the given area via the vehicle detector (e.g. magnetometer 112, accelerometer 113, etc) at Block 651. Thereafter, the method includes determining information about the vehicle, in response to sensing arrival of the vehicle to the given location, using the wireless transceiver 114 and/or the vehicle detector (e.g. magnetometer 112, accelerometer 113, etc) at Block 652. Then, the method continued with transmitting information to the server using the transceiver 114 at Block 653.

In some instances, the processor 111 may transmit an application trigger to cause the device within the vehicle (e.g. smartphone, infotainment system, etc) to launch an application. This application may prompt the user for payment, provide the user with notice that they are authorized or not authorized, provide the user with information about where to park, where to pick up cargo, or where to drop off cargo, provide the user with information about valet parking (such as price), or provide the user with information about an order from a merchant.

In some applications, for example such as the one shown in FIG. 1C, rather than a vehicle sensing device performing the above steps, a hub 109 works in accordance with a counting device 141 to perform the above functions. The hub 109 contains similar components to the vehicle sensing device described above, as is apparent from FIG. 4B, and has similar functionality to the vehicle sensing device as well, with the exception being that it lacks a magnetometer and accelerometer, and instead determines arrival and departure of vehicles via triggering of the counting device 141 by the weight of the vehicles driving over the counting device 141. It should be appreciated that the hub 109 may actually be a portable wireless electronic device, such as a smartphone or tablet.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A system for monitoring arrival of a vehicle, the system comprising:
a server configured to transmit parking lot inventory information to a parking lot operator;
a plurality of vehicle detection devices configured to sense arrival of the vehicle at a first area, and cause information about the vehicle to be transmitted from a first vehicle detection device of the plurality of vehicle detection devices to a second vehicle detection device of the plurality of vehicle detection devices for relaying by the second vehicle detection device to the server in response to sensing arrival of the vehicle, wherein the server is configured to determine a context of the vehicle based upon the information about the vehicle,
wherein the plurality of vehicle detection devices are spaced apart and physically emplaced at the first area, at least a portion of the vehicle detection devices in communication with the server over a network, and each of the plurality of vehicle detection devices comprising:
a magnetometer configured to detect a change in a magnetic field and generate magnetometer data representative of the change in the magnetic field;
an accelerometer physically emplaced at the first area and configured to detect vibrations and generate accelerometer data representative of the vibrations;
a processor configured to receive the magnetometer data and the accelerometer data and transmit the magnetometer data and accelerometer data; and
wherein the server is configured to determine whether the vehicle is entering or leaving the first area based upon the accelerometer data;
wherein at least one of the plurality of vehicle detection devices is configured to cooperate with at least one other vehicle detection device of the plurality of vehicle detection devices to perform triangulation to determine a location of the vehicle within the first area and to direct a driver of the vehicle to an open parking space within the first area;
wherein at least the first vehicle detection device of the plurality of vehicle detection devices communicates with the second vehicle detection device of the plurality of vehicle detection devices acting as a relay for the first vehicle detection device to transmit the information about the vehicle that is received therefrom to the server;
wherein, in response to the information about the vehicle, the server updates a parking lot inventory;

wherein at least one of the plurality of vehicle detection devices is configured to read vehicle payment information from a mobile wireless communications device in the vehicle; wherein the context comprises whether payment for the parking space for the vehicle has been received; wherein the server executes an action, the action comprising to transmit the updated parking lot inventory information to the parking lot operator, if payment for the parking space has been received; wherein the action comprises to send a prompt requesting payment for the parking space to the mobile wireless communications device if payment for the parking space has not been received.

2. The system of claim 1, wherein the action further comprises also to, in response to sending the prompt requesting payment for the parking space to the mobile wireless communications device and not receiving the payment within a given period of time, determine whether the vehicle has left the first area, and to alert the parking lot operator if the vehicle has not left the first area.

3. The system of claim 1, wherein the first vehicle detection device is configured to communicate with mobile wireless communications devices present in the vehicle; wherein the information comprises a number of mobile wireless communications devices present in the vehicle; wherein the context comprises a number of passengers in the vehicle; and wherein the server executes an action, the action comprising to send the number of passengers in the vehicle to a parking lot operator.

4. The system of claim 1, wherein the first vehicle detection device is configured to communicate with the mobile wireless communications device present in the vehicle; wherein the information comprises that the vehicle has arrived at the first area and that the mobile wireless communications device is present in the vehicle; wherein the context comprises an identity of a vehicle occupant; and wherein the server executes an action, the action comprising to send the identity of the vehicle occupant to the parking lot operator.

5. The system of claim 1, wherein the first vehicle detection device is further configured to send a parked location of the vehicle to the server; wherein the server is further configured to determine whether the parked location of the vehicle is authorized, and to notify the parking lot operator of unauthorized parking if the parked location of the vehicle is not authorized.

6. The system of claim 1, wherein the first vehicle detection device is also configured to sense departure of the vehicle from the first area; wherein the information comprises an arrival time and a departure time of the vehicle; wherein the context comprises an amount to be paid as a function of the arrival time and the departure time; and wherein the server executes an action, the action comprising to effectuate a transfer of funds from a user account associated with the vehicle to a merchant account associated with a parking lot operator.

7. The system of claim 1, wherein the first vehicle detection device is configured to read vehicle payment information from the mobile wireless communications device in the vehicle; wherein the context comprises whether payment for the parking space for the vehicle has been received and whether that payment is valid for the vehicle at a time of the arrival of the vehicle; wherein the server executes an action, the action comprising to update the parking lot inventory information and transmit the updated parking lot inventory information to the parking lot operator, if payment for the parking space is valid for the vehicle at the time of arrival.

8. The system of claim 1, wherein the information comprises at least one of vehicle size, vehicle weight, and vehicle configuration; wherein the context comprises an amount to be paid as a function of the information about the vehicle; and wherein the server executes an action, the action comprising to effectuate a transfer of funds from a user account associated with the vehicle to a merchant account associated with a parking lot operator.

9. The system of claim 1, wherein the context comprises whether the vehicle is authorized to be parked at the first area; and wherein the server executes an action, the action comprising to notify a parking lot operator if the vehicle is not authorized to be parked at the first area.

10. The system of claim 9, wherein the action further comprises to notify the mobile wireless communications device associated with the vehicle that the vehicle is not authorized to be parked at the first area.

11. The system of claim 1, wherein the information comprises a unique identifier for the vehicle; wherein the context comprises valet parking information for the vehicle; and the server executes an action, the action comprising to transmit the valet parking information to a parking lot operator.

12. The system of claim 11, wherein the server is also configured to receive a vehicle retrieval request, and to notify the parking lot operator of the vehicle retrieval request.

13. The system of claim 1, wherein the information comprises that the vehicle has arrived at the first area; wherein the context comprises an amount to be paid as a function of the information about the vehicle and a remaining parking space inventory; and wherein the server executes an action, the action comprising to effectuate a transfer of funds from a user account associated with the vehicle to a merchant account associated with a parking lot operator.

14. The system of claim 1, wherein the server executes an action, the action comprising to send the context of the vehicle to a retail establishment associated with the first area.

15. The system of claim 14, wherein the information comprises profile information read from the mobile wireless communications device within the vehicle; and wherein the context comprises an order associated with the profile information.

16. The system of claim 1, wherein the information comprises that the vehicle has arrived at the first area; wherein the context comprises directions to the open parking space; and wherein the server executes an action, the action comprising to cause the directions to be displayed in the vehicle.

17. A method of monitoring arrival of a vehicle by a server and a plurality of vehicle detection devices, the method comprising:

sensing arrival of a vehicle at a given location, by the plurality of vehicle detection devices configured to sense arrival of the vehicle at a first area, and causing information about the vehicle to be transmitted from a first vehicle detection device of the plurality of vehicle detection devices to a second vehicle detection device of the plurality of vehicle detection devices for relaying by the second vehicle detection device to the server in response to sensing arrival of the vehicle, wherein the server is configured to determine a context of the vehicle based upon the information about the vehicle, the plurality of vehicle detection devices spaced apart and physically emplaced at the first area and at least a portion of the plurality of vehicle detection devices in communication with the server over a network, at least one of the plurality of vehicle detection devices comprising:
- a magnetometer configured to detect a change in a magnetic field and generate magnetometer data representative of the change in the magnetic field;
- an accelerometer physically emplaced at the first area and configured to detect a vibration and generate accelerometer data representative of the vibration; and
- a processor configured to receive the magnetometer data and the accelerometer data and transmit the magnetometer data and accelerometer data;

transmitting, by the processor of at least one of the plurality of vehicle detection devices, the magnetometer data and accelerometer data to the server;

determining, by the server whether the vehicle is entering or leaving the first area based upon the accelerometer data;

transmitting parking lot inventory information from the server to a parking lot operator; and reading vehicle payment information from a mobile wireless communications device in the vehicle, using the first vehicle detection device;

wherein at least one of the plurality of vehicle detection devices is configured to cooperate with at least one other vehicle detection device of the plurality of vehicle detection devices to perform triangulation to determine a location of the vehicle within the first area and to direct a driver of the vehicle to an open parking space within the first area;

wherein at least the first vehicle detection device of the plurality of vehicle detection devices communicates with the second vehicle detection device of the plurality of vehicle detection devices acting as a relay for the first vehicle detection device to transmit the information about the vehicle that is received therefrom to the server;

wherein, in response to the information about the vehicle, the server updates a parking lot inventory;

wherein the context comprises whether payment for a parking space for the vehicle has been received; wherein the server executes an action, the action comprising to transmit the updated parking lot inventory information to the parking lot operator, if payment for the parking space has been received; and wherein the action further comprises to send a prompt requesting payment for the parking space to the mobile wireless communications device if payment for the parking space has not been received.

18. A system for monitoring arrival of a vehicle, the system comprising:
- a server;
- a plurality of vehicle detection devices configured to sense arrival of the vehicle at a first area, and cause information about the vehicle to be transmitted from a first vehicle detection device of the plurality of vehicle detection devices to a second vehicle detection device of the plurality of vehicle detection devices for relaying by the second vehicle detection device to the server in response to sensing arrival of the vehicle, wherein the server is configured to determine a context of the vehicle based upon the information about the vehicle, wherein the plurality of vehicle detection devices are spaced apart and physically emplaced at the first area, at least a portion of the vehicle detection devices in communication with the server over a network, and each of the plurality of vehicle detection devices comprising:

a magnetometer configured to detect a change in a magnetic field and generate magnetometer data representative of the change in the magnetic field;

an accelerometer physically emplaced at the first area and configured to detect vibrations and generate accelerometer data representative of the vibrations;

a processor configured to receive the magnetometer data and the accelerometer data and transmit the magnetometer data and accelerometer data; and wherein the server is configured to determine whether the vehicle is entering or leaving the first area based upon the accelerometer data;

wherein at least one of the plurality of vehicle detection devices is configured to cooperate with at least one other vehicle detection device of the plurality of vehicle detection devices to perform triangulation to determine a location of the vehicle within the first area and to direct a driver of the vehicle to an open parking space within the first area, wherein at least the first vehicle detection device of the plurality of vehicle detection devices communicates with the second vehicle detection device of the plurality of vehicle detection devices acting as a relay for the first vehicle detection device to transmit the information about the vehicle that is received therefrom to the server, wherein, in response to the information about the vehicle, the server updates a parking lot inventory, wherein the server is configured to transmit parking lot inventory information to a parking lot operator; wherein at least one of the plurality of vehicle detection devices is configured to read vehicle payment information from a mobile wireless communications device in the vehicle; wherein the context comprises whether payment for the parking space for the vehicle has been received; wherein the server executes an action, the action comprising to transmit the updated parking lot inventory information to the parking lot operator, if payment for the parking space has been received; wherein the action comprises to send a prompt requesting payment for the parking space to the mobile wireless communications device if payment for the parking space has not been received, wherein the action further comprises also to, in response to sending the prompt requesting payment for the parking space to the mobile wireless communications device and not receiving the payment within a given period of time, determine whether the vehicle has left the first area, and to alert the parking lot operator if the vehicle has not left the first area, and wherein the first vehicle detection device is further configured to send a parked location of the vehicle to the server; wherein the server is further configured to determine whether the parked location of the vehicle is authorized, and to notify the parking lot operator of unauthorized parking if the parked location of the vehicle is not authorized.

* * * * *